United States Patent
Scott

(10) Patent No.: US 11,862,354 B2
(45) Date of Patent: Jan. 2, 2024

(54) NUCLEAR REACTOR PASSIVE REACTIVITY CONTROL SYSTEM

(71) Applicant: Ian Richard Scott, Stratford on Avon (GB)

(72) Inventor: Ian Richard Scott, Stratford on Avon (GB)

( * ) Notice: Subject to any disclaimer, the term of this patent is extended or adjusted under 35 U.S.C. 154(b) by 0 days.

(21) Appl. No.: 18/044,479

(22) PCT Filed: Sep. 1, 2021

(86) PCT No.: PCT/EP2021/074175
§ 371 (c)(1),
(2) Date: Mar. 8, 2023

(87) PCT Pub. No.: WO2022/053374
PCT Pub. Date: Mar. 17, 2022

(65) Prior Publication Data
US 2023/0260668 A1    Aug. 17, 2023

(30) Foreign Application Priority Data
Sep. 9, 2020   (GB) .................................. 2014182

(51) Int. Cl.
*G21C 7/22*   (2006.01)
*G21C 7/32*   (2006.01)
(Continued)

(52) U.S. Cl.
CPC ................ *G21C 7/22* (2013.01); *G21C 7/02* (2013.01); *G21C 7/24* (2013.01); *G21C 7/32* (2013.01);
(Continued)

(58) Field of Classification Search
CPC ... G21C 7/22; G21C 7/32; G21C 7/02; G21C 7/24; G21C 15/26; G21C 15/247; G21C 3/54; G21C 1/24
(Continued)

(56) References Cited

U.S. PATENT DOCUMENTS

| 3,284,307 | A | * | 11/1966 | Schortmann | G21C 7/22 376/209 |
| 3,620,315 | A | * | 11/1971 | Walton | G21C 7/26 310/11 |
| 2013/0177120 | A1 | | 7/2013 | Cheatham et al. | |
| 2018/0286525 | A1 | * | 10/2018 | Scott | G21C 15/28 |

FOREIGN PATENT DOCUMENTS

| JP | H0961574 A | 3/1997 |
| WO | 2016059364 A1 | 4/2016 |

OTHER PUBLICATIONS

Fang, "The phase diagram of the RbBr—NaBr system", Calphad 28, No. 1 (2004): 9-14. (Year: 2004).*

(Continued)

*Primary Examiner* — Jack W Keith
*Assistant Examiner* — Daniel Wasil
(74) *Attorney, Agent, or Firm* — Renner, Otto, Boisselle & Sklar, LLP

(57) ABSTRACT

A passive nuclear reactor control device. The passive nuclear reactor control device comprises a sealed chamber, which comprises a reservoir and a tube in fluid communication with the reservoir. A molten salt is within the sealed chamber, the molten salt being a eutectic mixture of a monovalent metal halide, and a fluoride or chloride of one or more lanthanides and/or a fluoride or chloride of hafnium. A gas is within the sealed chamber, and the gas does not react with the molten salt.

7 Claims, 3 Drawing Sheets

(51) Int. Cl.
  *G21C 7/02*     (2006.01)
  *G21C 7/24*     (2006.01)
  *G21C 15/26*    (2006.01)
  *G21C 1/24*     (2006.01)
  *G21C 15/247*   (2006.01)
  *G21C 3/54*     (2006.01)

(52) U.S. Cl.
  CPC .................. *G21C 1/24* (2013.01); *G21C 3/54* (2013.01); *G21C 15/247* (2013.01); *G21C 15/26* (2013.01)

(58) Field of Classification Search
  USPC ........................................ 376/210, 328, 330
  See application file for complete search history.

(56) References Cited

OTHER PUBLICATIONS

International Atomic Energy Agency, Passive Shutdown Systems for Fast Neutron Reactors, IAEA Nuclear Energy Series No. NR-T-1.16, IAEA, Vienna (2020).
International Preliminary Report on Patentability for corresponding Application No. PCT/EP2021/074175, dated Sep. 23, 2022.
International Search Report and Written Opinion for corresponding Application No. PCT/EP2021/074175, dated Nov. 22, 2021.
GB Search Report for corresponding Application No. GB2014182.6, dated Oct. 28, 2020.

* cited by examiner

NUCLEAR REACTOR PASSIVE REACTIVITY CONTROL SYSTEM

This application is a national phase of International Application No. PCT/EP2021/074175 filed Sep. 1, 2021, which claims priority to GB Application No. 2014182.6 filed Sep. 9, 2020, each of which is hereby incorporated herein by reference in its entirety.

FIELD OF THE INVENTION

The present invention relates to control devices for nuclear reactors

BACKGROUND

Nuclear fission reactors rely on having a nuclear reactivity (k effective) of exactly 1 under normal operation. A reactivity even slightly above 1 leads to exponential increase in energy generation from fission while a reactivity below 1 leads to an exponential fall in energy generation to zero.

This very precise control of reactivity is normally achieved through a combination of passive systems, that require no human or automated control, and active systems. The most important passive system is that the reactor must have a negative temperature coefficient of reactivity so that if power increases, temperature rises and reactivity falls. Another passive system is the incorporation of "burnable" neutron absorbers (poisons) in the reactor core which initially suppress reactivity but, as they are destroyed by neutron absorption, suppress reactivity decreasingly.

Active systems are typically mechanical control rods which insert or withdraw neutron absorbing material to the reactor core.

Reliance on these active systems is a major source of safety hazard, since any mechanical system can fail or be inappropriately used. The Chernobyl disaster was ultimately triggered by human error leading to incorrect use of the control rod systems.

A passively operating system to replace or to complement control rods has therefore been a goal of the nuclear industry for many decades. An excellent summary of the current status of such passive systems is provided in the IAEA document NR-T-1.16 "Passive Shutdown Systems for Fast neutron reactors".

The mechanically most simple system described is where molten lithium metal expands on heating and is forced down a tube into the reactor core. This is an elegant system of extremely high reliability and is reversible so that it can be used to continually control the power of the reactor to maintain an output coolant temperature within a defined range.

Unfortunately, such lithium based devices suffer from the drawback that when Li-6 absorbs a neutron it emits a tritium and helium atom. This quite rapidly pressurises the system but more crucially, tritium is a highly radioactive and very mobile gas and its production therefore creates an additional safety hazard.

Most of the research to date has been on passive reactivity control devices in light water reactor or molten metal cooled fast reactors. In recent years there has been a major increase in interest in molten salt reactors where either the fuel or the coolant are molten salts. These reactors are much superior than other reactors, in part because expansion of the molten salt fuel creates an unusually strongly negative reactivity coefficient which makes the reactivity strongly self stabilising. However, molten salts bring a problem for use of lithium based passive reactivity control systems because the tritium produced is highly mobile in the molten salt and will in fact diffuse through metal walls making its containment extremely challenging.

There remains therefore a need for a simple, effective, reliable passive reactivity control system in molten salt based reactors that does not create a tritium management problem.

SUMMARY

According to a first aspect, there is provided a passive nuclear reactor control device. The passive nuclear reactor control device comprises a sealed chamber, which comprises a reservoir and a tube in fluid communication with the reservoir. A molten salt is within the sealed chamber, the molten salt being a eutectic mixture of a monovalent metal halide, and a fluoride or chloride of one or more lanthanides and/or a fluoride or chloride of hafnium. A gas is within the sealed chamber, and the gas does not react with the molten salt.

According to a second aspect there is provided a nuclear reactor comprising a reactor core and a passive nuclear reactor control device according to the first aspect, wherein at least the tube of the sealed chamber extends into the reactor core.

DETAILED DESCRIPTION

Figure 1:
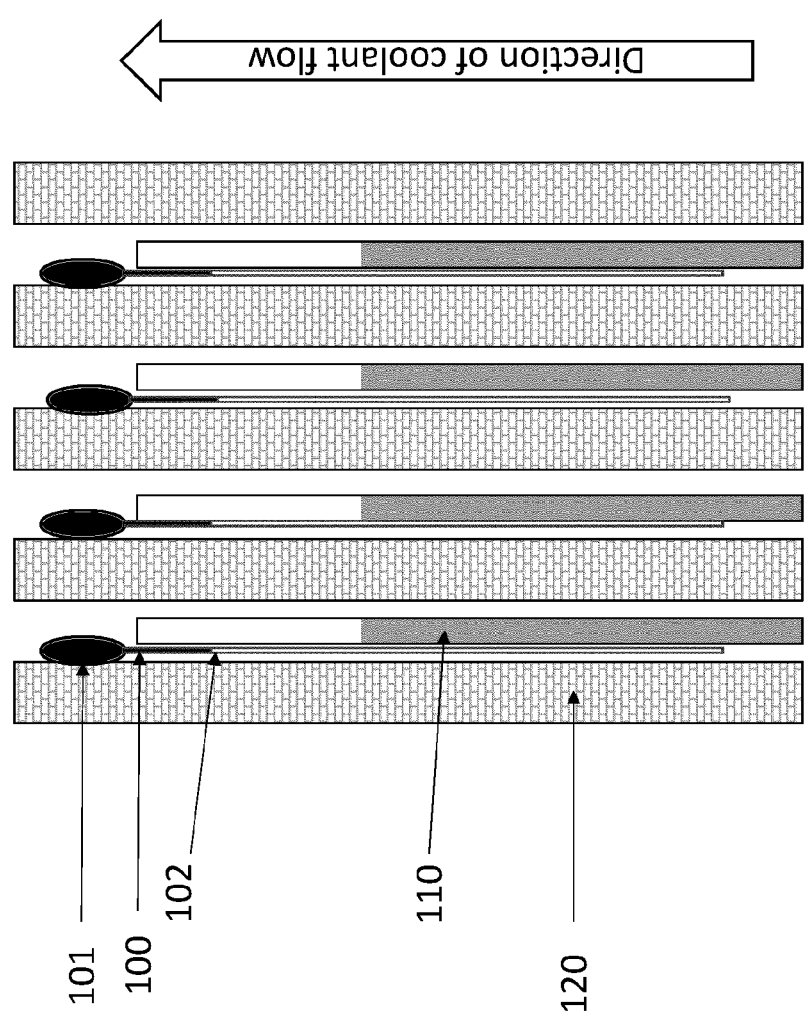
FIG. 1 is a schematic illustration of a reactor core.

The passive reactivity control device incorporates a reservoir of a molten salt containing a strong neutron absorber from the lanthanide family or hafnium in the form of a fluoride or chloride salt mixed with a monovalent salt to form a low melting point eutectic mixture.

Lanthanides do not generate significant tritium or helium on irradiation. They are however high melting point metals so cannot simply replace the well known lithium in the reactivity control device. Conversion to fluoride or chloride salt and formation of a eutectic salt mixture with a monovalent metal halide reduces the melting point to a useable level.

The device resembles a mercury thermometer. The reservoir, or thermometer bulb, is located in the hot outlet coolant (or coolant combined with fuel) salt and the narrow tube, or thermometer stem, runs into the reactor core. The stem contains an inert gas (ie a gas that does not react significantly with the molten salt) which is compressed as the neutron absorbing salt expands down the stem and the pressure of that gas returns the neutron absorbing salt to the bulb on cooling of the reservoir. Particularly useful lanthanides for use in a thermal spectrum reactor are Gadolinium, Europium, Samarium which each have neutron absorbance cross sections of several thousand barns. However other less strongly absorbing lanthanides such as Dysprosium, Erbium or Hafnium can also be used and mixtures of multiple lanthanides can also be used which can be advantageous if it is desired to reduce the neutron absorption of the salt so that it is "grey" rather than "black" to neutrons.

For fast reactors the most effective lanthanides are Europium and Hafnium but again, mixtures of less strongly absorbing lanthanides can have utility.

There are two possible approaches to avoid breaking of the molten salt fluid column during expansion and contraction. In the first approach, the reservoir is located below the tube, and the tube is oriented generally upwards (i.e. such that the column will be maintained by gravity, and the molten salt expands upwards). In the second approach, the tube is sufficiently narrow for the molten salt fluid column to remain intact when inverted—the radius required will depend on the contact angle between the molten salt fluid and the inside surface of the tube. In the first case, the tube can have any desired width. In the second case, the tube can have any desired orientation.

In either case, for the molten salt fluid column to remain intact during expansion and contraction, it is desirable that the surface of the stem containing it has a large contact angle with the molten salt fluid, and in particular that the surface is not wetted by the fluid. Where wetting of a metal surface is a problem, this can be improved by depositing a coating on the wetted surface of a material with which the molten salt has a high contact angle. Pyrolytic carbon is one such suitable coating.

Example 1

A nuclear reactor core is formed from a series of molybdenum tubes containing a mixture of uranium fluoride and sodium fluoride. The uranium is enriched in U235 isotope. The tubes are located in channels in graphite blocks and a coolant liquid passes upwards through the channel between the graphite and the tube.

FIG. 1 shows an array of passive reactivity devices 100 in a graphite moderated liquid molten salt fuelled reactor core.

Figure 2:
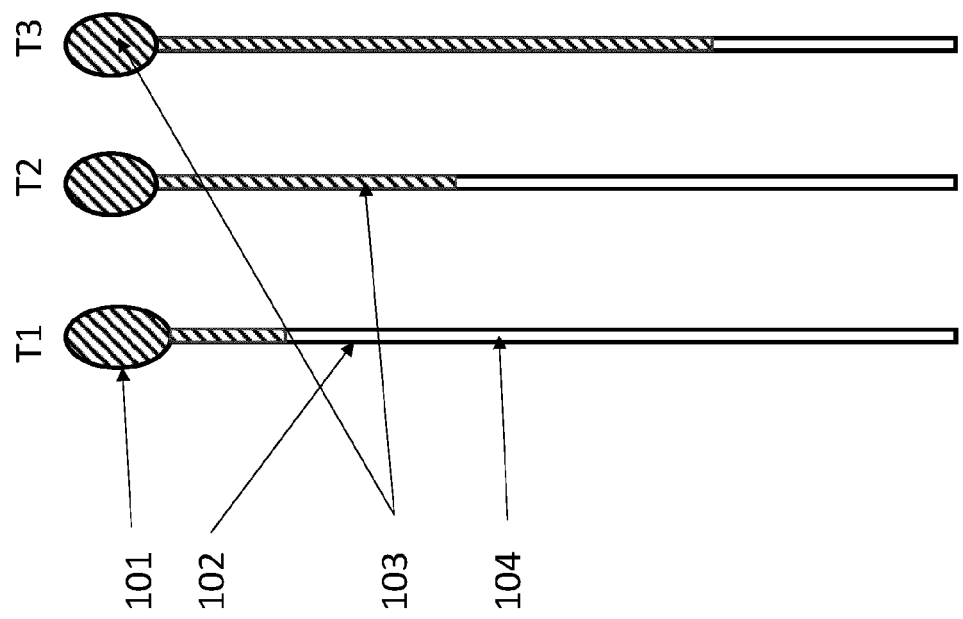
FIG. 2 is a schematic illustration of a passive nuclear reactor control device at three different temperatures.

The reservoir 101 of the passive reactivity device is located above the level of the fuel salt 110 in the tube as shown in FIG. 1. The stem 102 of the device projects down through the annulus between the graphite 120 and the tube and terminates at the bottom of the fuel tube. FIG. 2 shows the location of the neutron absorbing fluid 103 in the bulb 101 and stem 102 at different coolant output temperatures T1<T2<T3. The remainder of each passive reactivity device contains a gas 104 which does not react with the neutron absorbing fluid. On the left is with the device at a temperature below normal reactor operating temperature, central is the device at normal operating temperature and right is above normal operating temperature.

Example 2

A nuclear reactor core is formed from a series of molybdenum tubes containing a mixture of uranium fluoride and sodium fluoride. The uranium is enriched in U235 isotope. The tubes are located in channels in graphite blocks and a coolant liquid passes downwards through the channel between the graphite and the tube.

Figure 3:
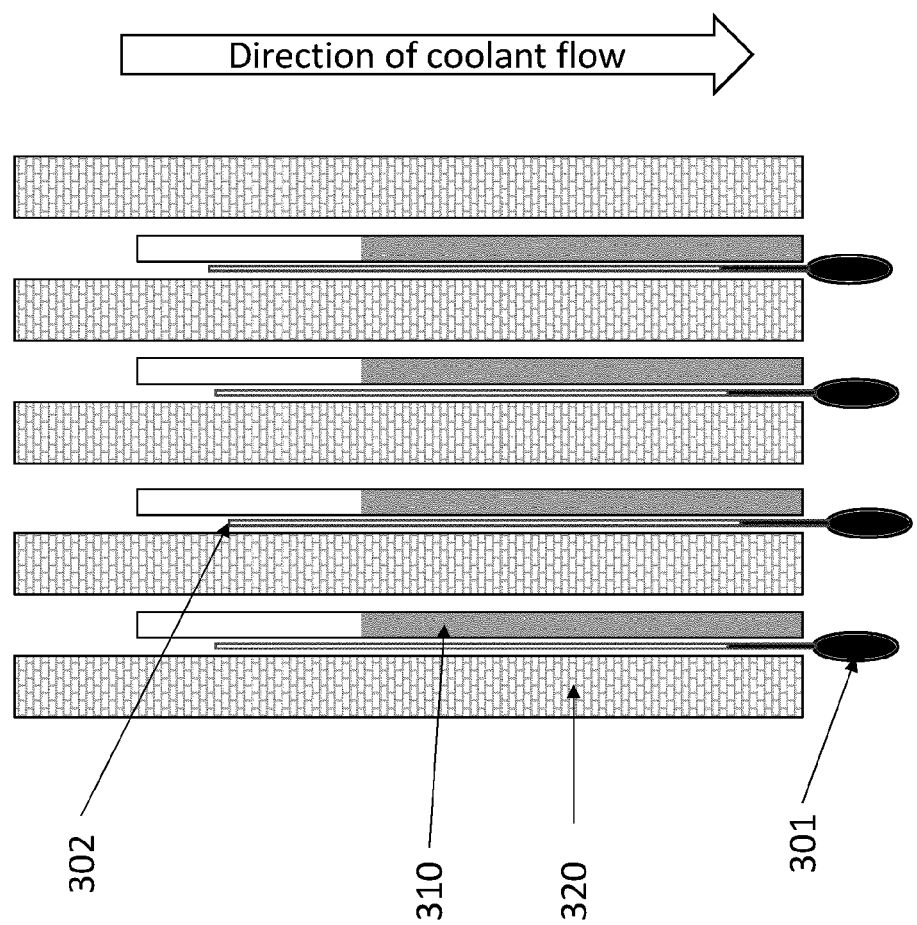
FIG. 3 is a schematic illustration of an alternative reactor core.

FIG. 3 shows an arrangement in which the bulbs 301 of the passive reactor control devices are located below the fuel tubes, i.e. below the fuel salt 310, and the stems 302 extend up between the graphite moderators 320 and the fuel salt 310.

The invention claimed is:

1. A passive nuclear reactor control device, comprising:
 a sealed chamber comprising:
  a reservoir;
  a tube in fluid communication with the reservoir,
 a molten salt within the sealed chamber, the molten salt being a eutectic mixture of:
  a monovalent metal halide, and
  a fluoride or chloride of:
   one or more lanthanides and/or
   hafnium;
 a gas within the sealed chamber which does not react with the molten salt.

2. A passive nuclear reactor control device according to claim 1, wherein the inner surface of the sealed chamber is not wettable by the molten salt.

3. A passive nuclear reactor control device according to claim 2, wherein the internal surface of the sealed chamber is coated with pyrolytic carbon.

4. A passive nuclear reactor control device according to claim 1, wherein the molten salt comprises a fluoride or chloride of any one or more of gadolinium, europium, samarium, or hafnium.

5. A nuclear reactor comprising a reactor core and a passive nuclear reactor control device according to claim 1, wherein at least the tube of the sealed chamber extends into the reactor core.

6. A nuclear reactor according to claim 5, wherein the reservoir of the sealed chamber is located such that coolant flows from the reactor core to the reservoir of the sealed chamber.

7. A nuclear reactor according to claim 5, wherein the reactor core comprises one or more graphite blocks and a plurality of channels within the one or more graphite blocks, each channel containing a fuel tube containing fissile material and at least a subset of the channels containing the tube of the passive nuclear reactor control device.

* * * * *